July 3, 1962 M. BRANDIZZI 3,042,410

RECORD STACK HEIGHT COMPENSATING MECHANISM FOR THE NEEDLE OF TONE ARM OF AUTOMATIC RECORD CHANGERS

Filed June 12, 1959 4 Sheets-Sheet 1

INVENTOR,
Mario Brandizzi
BY
Tarkof and Osteroff,
attorneys

INVENTOR.
Manlio Brandizzi
BY Tarlofand Oderoff,
Attorneys

INVENTOR
Manlio Brandizzi
BY Teleford Ostroff

July 3, 1962 M. BRANDIZZI 3,042,410

RECORD STACK HEIGHT COMPENSATING MECHANISM FOR THE NEEDLE OF TONE ARM OF AUTOMATIC RECORD CHANGERS

Filed June 12, 1959 4 Sheets-Sheet 4

INVENTOR.
Manlio Brandizzi
BY Toulmin and Oikeroff
Attorneys

United States Patent Office 3,042,410

Patented July 3, 1962

3,042,410

RECORD STACK HEIGHT COMPENSATING MECHANISM FOR THE NEEDLE OF TONE ARM OF AUTOMATIC RECORD CHANGERS

Manlio Brandizzi, 2264 36th St., Mar Del Plata, Province of Buenos Aires, Argentina Filed June 12, 1959, Ser. No. 819,865
24 Claims. (Cl. 274—10)

This invention refers to a height compensating mechanism for automatic record changers for maintaining the pick-up or tone arm's needle cartridge arrangement always at the same angle with regard to the record's groove, independently of the height of the stack of records located on the turntable.

Requirements for a high fidelity reproduction of good records are constantly increasing and as the quality of recording increases, it is likewise necessary to eliminate all possible mechanical aberrations which are detrimental to the quality of the sound reproduction. One of the defects of the automatic record changers now in use is that they have no means for correcting the angular change the needle is subject to, when the height of the stack of records on the turntable increases, which is particularly quite pronounced in the automatic record changers where the length of the tone arm is rather small. This is quite evident for anybody skilled in the art and therefore further detailed explanations on the subject seem to be superfluous.

The present invention overcomes this drawback by providing in an automatic record changer having a base plate, a central spindle, a turntable mounted on said central spindle and being adapted to successively receive, one by one, the records of a stack of records arranged on said spindle and spaced apart from said turntable, each record having a groove, a shaft, a tone arm including at least one needle and swingably mounted on said shaft, and record changer means, a height compensating mechanism for maintaining said needle always at the same angle with regard to the groove of each record independently of the height of the stack of records located on said turntable, said height compensating mechanism including means for stepwise changing the height of at least one of said shaft and spindle with regard to said base plate and which last mentioned means are synchronized with said record changer means.

It is an object of the present invention to provide an automatic height compensating means for record changers which assures that the needle or needles of the pick-up arm define always the same and correct angle with regard to the groove of the record no matter how many records are already stored on the turntable, whereby the vertical tracking error is likewise eliminated.

Another object is to reduce by means of the present invention the variations of the horizontal tracking of the needle since the latter remains always constant.

A further object of the present invention is to provide these height compensating means in such an organization that the concept of the present invention may be adapted to almost any known record changer.

Still a further object is to achieve an optimum sound reproduction from the view point of the pressure of the stylus tone arm acting on the record, which latter is likewise always in the same position and therefore constant.

These and further objects and advantages of the present invention will become more apparent during the course of the following description, wherein by way of example several embodiments are described in connection with the accompanying drawings, wherein.

Figures 1, 11, 12, 13, 14:
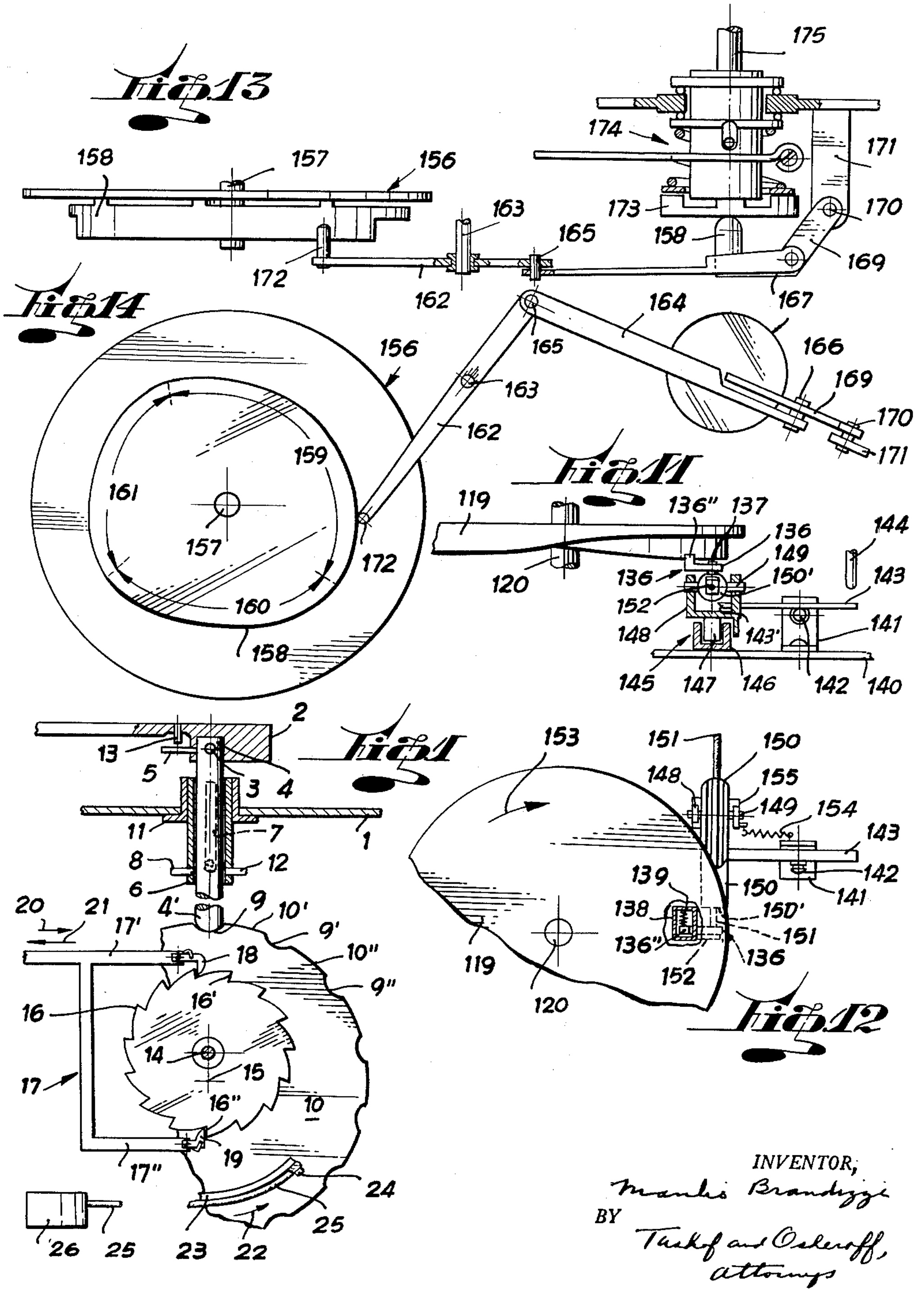
FIG. 1 is a schematic side elevation, partially in longitudinal section of a first embodiment, wherein the height compensating mechanism is applied to the shaft of the tone arm.
FIG. 11 is a front elevation of the cam of the mechanism shown in FIG. 9 in relationship with the start restoring means of the height compensating mechanism.
FIG. 12 is a top plan view of the means shown in FIG. 11.
FIG. 13 is a side elevation of still another embodiment wherein the tone arm of the record changer is operated by a peripherical cam arrangement.
FIG. 14 is a top plan view of FIG. 13.

In FIG. 1 a first automatic record changer is shown and more particularly the base plate 1 thereof, a tone arm 2 pivoted by means of pivot 3 to a shaft 4, which near the pivot 3 is integral with a projecting ear 5 and which is rotatably housed in a vertical bushing 6 which has a longitudinal slot 7 in which a pin 8 integral with shaft 4 is suitably guided. The lower end of shaft 4 ends in a semispherical tip portion 4' which rests in the position shown in FIG. 1 in a notch 9 of a cam disk 10.

The base plate 1 comprises a bearing 11 in which the bushing 6 is rotatably housed. Bushing 6 is connected to a commanding plate 12 which forms part of any known arrangement of automatic record changer and which is connected to the necessary means for radially rotating the tone arm 2 from its resting position towards the beginning of the groove of the record to be played and to further lead said tone arm from the trip groove to the resting position, as is well known by those skilled in the art.

In this embodiment the tone arm 2 is further provided with an abutment pin 13 adapted to enter into abutting contact with ear 5 as is likewise known by those skilled in the art.

The cam disk 10 is mounted on a stub shaft 14, which is eccentric with regard to the geometric center 15 of the cam disk 10. A ratchet wheel 16 is likewise mounted on said stub shaft 14 and in functional relationship with a double arm 17, the upper branch 17' of which is provided with a pulling pawl 18, while the lower branch 17'' is provided with a pushing pawl 19.

It will readily be understood that when the double arm 17 slides in the direction indicated by arrow 20, that the pulling pawl 18 will slide over the next tooth in the drawing identified by 16′ while the pushing pawl 19 will push tooth 16″ in counterclockwise direction. When the cam disk 10 advances in an arcuate path corresponding to one tooth, in this case by the pushing forward of tooth 16″, the semispherical tip portion 4′ will be raised out of the notch 9 onto the peripherical portion 10′ thereby raising the tone arm in a magnitude sufficient so that the needle (not shown) thereof will be located at a height about the record (not shown) to be played and at this instant the commanding plate 12 will rotate the bushing 6 to locate the needle above the entering groove of the record and at this instant the double arm 17 will start to move backward in the direction indicated by arrow 21 whereby the pulling pawl 18 which is now meshing with tooth 16′ will move the cam disk 10 to rotate until the next notch 9′ is located below the tip portion 4′ whereby the tone arm 2 is lowered and the needle will enter the groove of the record to be played.

Obviously the up and downward movement of shaft 4 is suitably guided by pin 8 in slot 7 which also assures that when the bushing 6 is rotated by commanding plate 12 that such a rotation is followed by shaft 4.

It will be appreciated that the distance between the axis of said stub shaft 14 and the first notch 9 is smaller than the distance between the last mentioned axis and the next notch 9′, so that the needle will enter the groove with the tone arm in a determined optimum position. The increment of those two distances is equal to the width of one record.

When the needle reaches the end of the groove of the record the double arm 17 moves again in the direction indicated by arrow 20 thereby raising shaft 4 to the next peripherical portion 10″ which will raise the needle above the record just played and allow the commanding plate 12 and its coupled arrangement (not shown) to return to the start position. As soon as the next record has fallen onto the just played record the double arm 17 moves again in the direction indicated by arrow 21 at the same time as the commanding plate 12 turns the tone arm 2 above the starting portion of the groove of said next record at which instant the following notch 9″ will be located below the tip portion 4′ thereby lowering the needle into the groove and thus repeating the above described cycle.

In view of the eccentric arrangement of stub shaft 14 with regard to the geometric center 15 it will be appreciated that as the cam disk 10 continues its counter clockwise rotation as indicated by arrow 22 the tone arm 22 will be raised more and more in concordance with the number of records which are piled up on the turntable so that as already stated, the needle will always enter the groove of the pertinent record at the same optimum angle.

A guiding rib 23 is integral with said cam disk 10 and a pin 24 adjacently arranged to said guiding rib enables the connection thereto of a cable 25 which is guided by said rib 23 and which is connected to pulling means 26 for restoring the cam disk 10 and its associated parts to its start position by pulling on cable 25 and during which operation the double arm 17 is withdrawn from its engagement with the ratchet wheel 16.

This arrangement enables the full appreciation of the concept of the present invention although in practice it is not the best proposition because, particularly during the restoring step when the pulling means 26 rotate the came disk 10 in clockwise direction, it is quite noisy and the tone arm 2 and more particularly its cartridge (not shown) is subject to the series of impacts which should be avoided.

Figures 2, 6, 7:
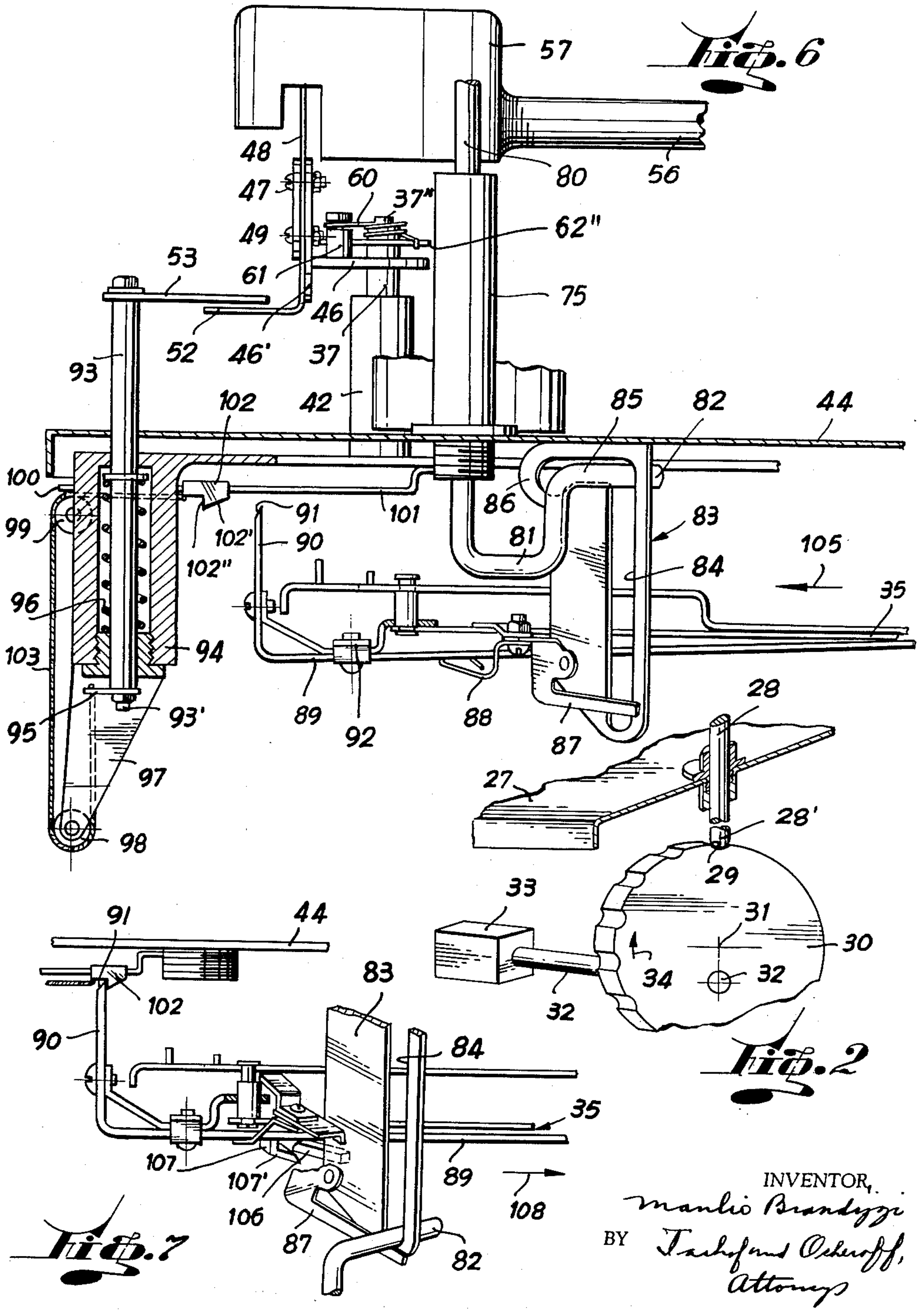
FIG. 2 is a schematical perspective view, partially in section of a height compensating mechanism based on the same principle as to the operating means as the one shown in FIG. 1, but wherein said height compensating mechanism is applied to the spindle of a turntable.
FIG. 6 is a perspective view of part of the height compensating mechanism of the embodiment of FIG. 3 showing in particular the details for restoring the height compensating mechanism to the start position.
FIG. 7 is a detail partially in perspective view of a modified embodiment with regard to those parts shown in FIG. 6.

It will be evident to anybody skilled in the art that this same concept could be applied to the turntable instead of the tone arm such as for instance schematically shown in the embodiment of FIG. 2 wherein the turntable 27 besides of rotating with its central spindle 28 will start at the maximum height position and will be lowered as the number of records located on a turntable will increase. The central spindle 28 comprises a semispherical tip portion 28′ which is rotatably housed in the position shown in the maximum height notch 29 of a cam disk 30, the geometrical center 31 of which is located above the driving shaft 32 which is the equivalent of the stub shaft 14 of FIG. 1. The driving shaft 32 could be connected to a similar arrangement as the ratchet wheel 16 described in connection with FIG. 1 which is here not shown, but the driving shaft 32 is simply schematically connected to a driving arrangement 33 which will intermittently rotate the cam disk 30 in clockwise direction as indicated by arrow 34 to progressively lower the turntable 27, as will be apparent to those skilled in the art.

The difference residing between the embodiment of FIG. 2 and the embodiment of FIG. 1, as is shown, is that in the embodiment of FIG. 2 shaft 32 is located below the geometrical center 31 while in the embodiment of FIG. 1 shaft 14 is located above the geometrical center 15.

In view of the operation described in connection with FIG. 1 it is not considered necessary to repeat that portion of the description in connection with FIG. 2. It will be sufficient to add that in the embodiment of FIG. 2 the driving arrangement 33 will also be in charge of restoring the turntable 27 to its start position by rotating the cam disk 30 in counter clockwise direction.

Reference will be made to FIGURES 3 to 6 wherein an embodiment is shown which corresponds to the V–M Model 1200A manufactured by the V–M Corporation, Benton Harbor, Michigan, U.S.A., and to which the present invention has been applied. Since as such the above referred to automatic V–M record changer is well known by those skilled in the art, only those parts have been schematically shown which are necessary for the understanding of the present invention. The V–M record changer has a slide assembly of which the slide 35 is partially shown in FIG. 3, which slide 35 is adapted to move to and fro and comprises a lower end platform 35′ and an upper platform 35″ linked by a sloped portion 36, thereby defining a first cam portion. A lift pin 37 having a spherical slide head portion 37′ rests on said slide 35 and comprises a washer 38 and a helical compression spring 39, one end of which butts against said washer 38 while the other end butts against a plate 40 whereby the lift pin 37 is urged against said slide 35. The diecast frame 41 is here schematically shown as integral with a bushing 42 in which said lift pin 37 is slidably and rotatably housed. The trip finger switch and clutch arrangement 43 already known by those skilled in the art is here only schematically shown inasmuch as it operates exactly on the same principle as on the known V–M record changers.

Figures 3, 9:
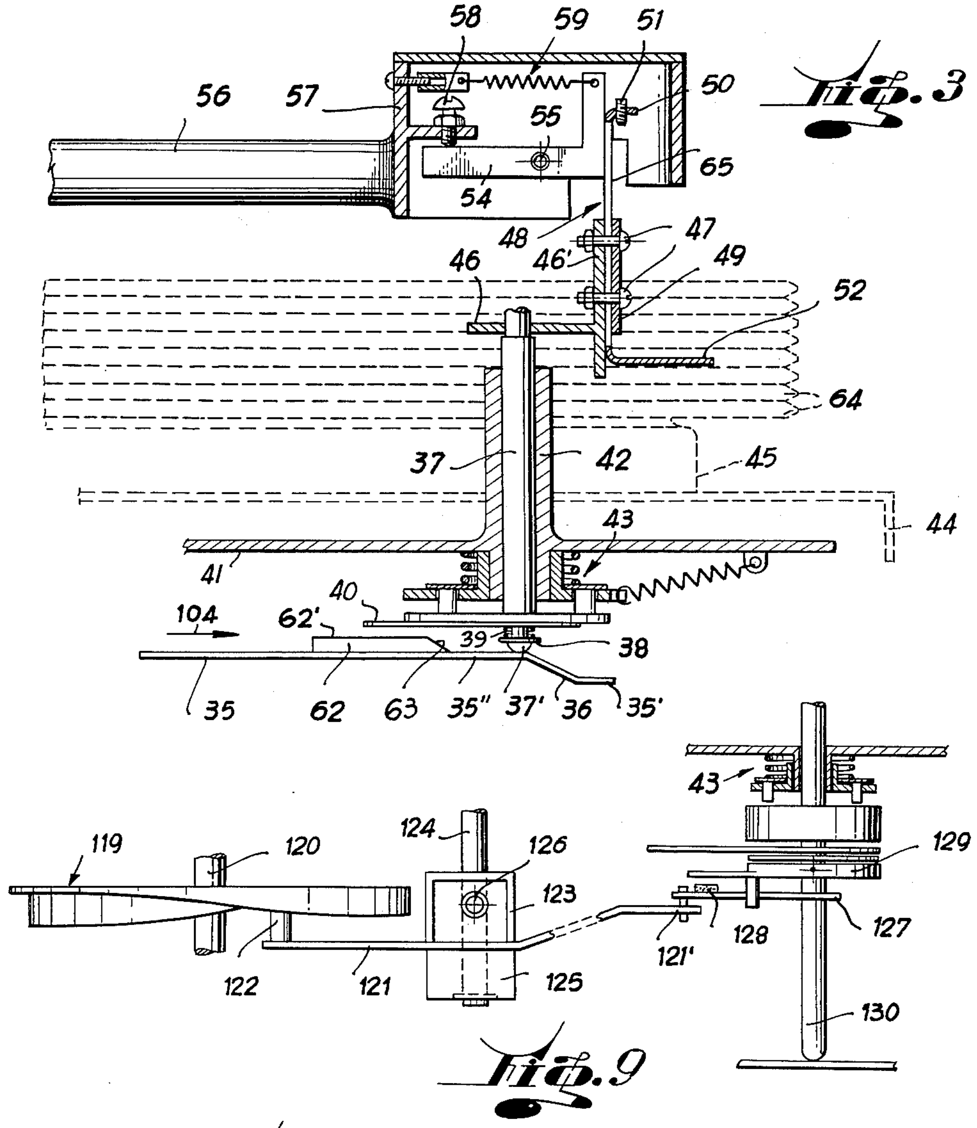
FIG. 3 is a side elevation, partially in section of a height compensating mechanism applied to a record changer of the type having a to and fro moving slide assembly to operate the tone arm.
FIG. 9 is a schematical side elevation of part of a record changer operated by a grooved rotary cam in functional relationship with the shaft of the tone arm.

In addition, in order to avoid overburdening of FIG. 3 but yet to give a more complete picture thereof the base plate 44 and the turntable 45 have been shown only in dotted lines.

The upper end 37″ of the lift pin 37 supports a bellcrank lever 46 having a vertical guide arm 46′ (see also FIG. 5) which in combination with the screw assemblies 47 slidably supports an elevator plate 48 urged against said vertical guide arm 46′ by a leaf spring 49 which is slightly arcuate. The elevator plate 48 comprises an upper bent ear 50 supporting an adjustable stop screw 51 adapted to enter in abutting contact with the upper end of the leaf spring 49. The elevator plate 48 further comprises a foot 52 which is engaged by a return lever 53 (see FIG. 6, not shown in FIG. 3) to which reference will be made later on. An upper portion of the elevator plate 48 is integral with an L shaped lever 54 on which by means of a pivot 55 the rear portion of the tone arm or pick-up arm 56 is mounted. The tone arm 56 comprises a rear casing 57 having an adjustable set screw 58 adapted to enter in abutting contact with said L shaped lever 54, as is already known in the art. The pick-up arm 56 is further provided with a spring arrangement 59 for graduating the weight of the pick-up arm 56 as far as its action on the needle (not shown) is concerned. This spring arrangement 59 is again well known in the art.

In addition it may be stated that the upper end 37'' of the lift pin 37 is provided with a torsion spring 60 connected (as better shown in FIG. 6) to a post 61 and to a plate 62'' to assure that the pick-up arm 56 is always in its proper position as is likewise already known.

Returning once more to FIG. 3, it may be appreciated that the slide 35 and more particularly the upper platform 35'' is further provided with a supplemental platform 62 having a sloped surface 63 and a plane surface 62' which is parallel to the upper platform 35'' and spaced apart in approximately a height equivalent to the width of one record such as records 64 only shown in dotted lines for illustrative purposes. The supplemental platform 62 there defines a second cam portion.

Figure 4:
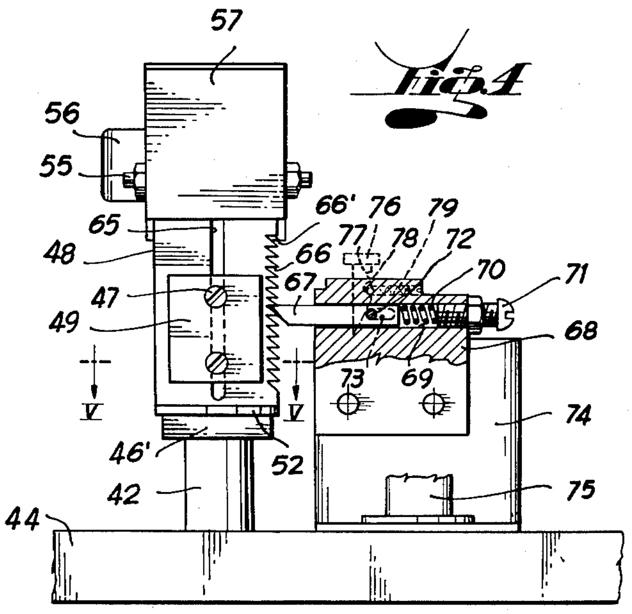
FIG. 4 is a rear view, partially in section of the tone arm and associated parts of the height compensating mechanism of the record changer of FIG. 3.

Turning now to FIG. 4 it may be appreciated there that the elevator plate 48 comprises a longitudinal slot 65 through which passes said screw assembly 47. One edge of said elevator plate 48 defines a ratchet rack 66 which is adapted to mesh with a resiliently urged slidable pawl 67 mounted in a block 68 having to this end a horizontal perforation 69 in which a spring 70 is housed. An adjustment screw arrangement 71 enables adjustment of the tension of said spring 70.

A stub pin 72 projects out of said perforation 69 and is guided by a slot 73 which limits its to and fro movement. The block 68 is mounted in a support 74 which in turn is arranged in the base plate 44. A portion of the records support arrangement and more particularly a sleeve 75, for orientation purposes is likewise shown in FIG. 4.

The portion shown in dotted lines in FIG. 4 is an aggregate which is not necessary for the present invention but which may be supplied in case the record changer provides means for repeating a record. More particularly, it consists of a hand operated press button 76 having a pair of notches 77 and 78 adapted to enter in blocking contact with a spring urged ball arrangement 79. If the press button 76 is pressed down so that the notch 77 enters in blocking contact with the spring urged ball arrangement 79 it will push back the stub pin 72 whereby the pawl 67 keeps out of engagement with the ratchet rack 66.

Turning now once more to FIG. 6 and more particularly to the sleeve 75 it will be appreciated that within the sleeve 75 a record support shaft 80 is mounted having a lower knee portion 81 and a free end portion 82, slidably mounted in a record support guide assembly 83 having an inverted L-shaped slot consisting of a vertical branch 84, a horizontal branch 85 ending in an enlarged retaining portion 86 as is already known in the art. The record support guide assembly 83 pivotally supports a stub arm 87 projecting sideways of said vertical branch 84 so that when the free end portion 82 of the record support shaft 80 is lowered to its cut off position the stub arm 87 will describe a clockwise movement.

The stub arm 87 further comprises a raising wire 88 projecting below said slide 35 and more particularly below a returner slide 89 pivotally linked to said slide 35 and having an upstanding arm 90 with a bevelled end tooth 91. An outwardly projecting disengagement nose 92 is mounted on said returner slide 89.

The returner lever 53 which engages the foot 52 is mounted on a vertical returner shaft 93 slidably arranged in a bushing 94 and having a lower ear 95 integral with the lower end portion 93' of said returner shaft 93. A compression spring 96 tends to urge said returner shaft 93 in upward direction. A bracket 97 is supported by said bushing 94 and rotatably supports at its lower end a first roller 98. A second roller 99 is arranged higher up and supported by a bracket 100 which is connected to a rail 101 which is substantially horizontal and on which a hook 102 is slidably mounted. A cable 103 links said hook 102 with said lower ear 95 passing over said rollers 98 and 99.

As to the operation of the arrangement, it will of course be presumed that the operation of the common V–M record changer is already well known. In the inoperative position the spherical slide head portion 37' (FIG. 3) is of course located on the lower end platform 35' and as said slide assembly 35 begins to move in the direction indicated by arrow 104 it will push lift pin 37 upward, due to the fact that the spherical slide head portion 37' is raised along the sloped portion 36 to eventually reach the upper platform 35'' at the same time as the trip finger switch and clutch arrangement 43 is being clutched. Simultaneously the pickup arm 56 is raised and the trip finger switch and clutch arrangement 43 becomes operative by rotating the raised pick-up arm 56 first in counter clockwise direction, (for instance with regard to FIG. 4) so that the ratchet rack 66 enters in mesh contact with the resiliently arranged slidable pawl 67; the arrangement being so synchronized that as soon as the mesh starts, the spherical slide head portion 37' (FIG. 3) is raised on the sloped surface 63 to finally reach the plane surface 62' of the supplemental platform 62 whereby the elevator plate 48 is raised in one tooth over the pawl 67 and as the slide 35 continues its movement it will start a sliding movement in opposite direction to that of arrow 104, whereby the lift pin 37 is lowered first back to the upper end platform 35'' and then back to the lower platform 35' at the same time as the clutched trip finger switch and clutch arrangement 43 moves the pick-up arm 56 in clockwise direction (with regard to FIG. 4) and thereby out of mesh with a pawl 67 and onto the record to be played, due to the frictional engagement of the elevator plate 48 with the leaf spring 49 the pick-up arm 56 stays in a position which is one tooth of the rack 66 higher than the previous position.

Obviously, if the record changer starts to play the first record on the turn table 45 (FIG. 3) the pawl 67 (FIG. 4) will have meshed with a first and uppermost tooth 66'. When the end of the record is reached and provided that further records are stored on the spindle (not shown in this embodiment) the record support shaft 80 (FIG. 6) and more particularly the free end portion 82 will be lowered within the vertical branch 84 in a magnitude equal to the width of one record and the automatic record changing mechanism will immediately upon the falling of the next record onto the previous record start a new operative cycle as above explained, whereby the elevator plate 48 is successively stepwise raised in relationship to the number of records played. At the same time the foot 52 (FIG. 6) gradually approaches the return lever 53 which is in the position shown in FIG. 6 due to the fact that the compression spring 96 is expanded and maintains the return lever 53 in the raised position.

Whenever the last record has been played as is already known, the free end portion 82 presses on stop arm 87 which is thereby counterclockwise rotated. Rotation of stop arm, besides its known function, due to the raising wire 88, will raise the returner slide 89 to its horizontal position and as the slide 35 moves in the direction indicated by arrow 105, the bevelled end tooth 91 will pass over the sloped surface 102' of hook 102 until meshing with the hook surface 102''. Due to the flexibility of wire 88 this movement may be easily performed. As the slide accomplishes its last movement in direction opposite to arrow 105 it will at the same time draw the hook 102 along the rail 101 and therewith, due to the cable 103, it will pull down the lower ear 95, vertical return shaft 93 and therewith due to the return lever 53, the elevator plate 48 and pick-up arm 56 which will be restored to the initial start position.

In this position the compression spring 96 remains compressed, the upstanding arm 90 remains in engagement with the hook 102 in the position where the spherical slide head portion 37' (FIG. 3) rests on the lower end platform 35' thereby the outwardly projecting disengagement nose 92 (FIG. 6) remains located below the lower knee portion 81. When the stack of records such as records 64 (FIG. 3) located on the turntable 45 is to be withdrawn from the spindle, as is already known, the record support is lifted and outwardly turned whereby the free end portion 82 is raised within the vertical branch 84 which liberates the stop arm 87 at the same time as due to the outwardly swinging movement of the record support shaft 80 will move the free end 82 through horizontal branch 85 to finally fall into the enlarged retaining portion 86, whereby the lower knee portion 81 presses on the outwardly projecting disengagement nose 82 whereby the bevelled end tooth 91 disengages the hook surface 102'', whereby the compressed spring 96 raises the vertical return shaft 93 to the position shown in FIG. 6 and at the same time the hook 102 slides back on the rail 101 likewise to the position shown in FIG. 6. The foot 52 is now again free to be stepwise like raised. In order that the disengagement of the bevelled end tooth 91 takes place it is required that the lower knee portion 81 stores during its downward movement in the enlarged retaining portion 86 sufficient kinetic energy to produce the disengagement. Thus usually the retaining portion 86 has to be enlarged with regard to the normal size.

To avoid such a modification it is possible to use the modified embodiment of FIG. 7 wherein the upstanding arm 90 is shown as engaging the hook 102 and therefore the returner slide 89 is approximately in the horizontal position while the free end 82 of the record support shaft is in the lowermost position within the vertical branch 84 whereby the stop arm 87 is in its raised position. The record support head assembly 83 comprises a projecting nose 106 and the returner slide 89 is provided with a wedge member 107 which is L-shaped and the free branch 107' thereof is adapted to enter in wedging contact with the projecting nose 106 as the slide 35 moves in the direction of arrow 108, whereby the bevelled end tooth 91 is disengaged. Returning once more to FIG. 4 it will be understood that when the press button 76 is pressed down that the pawl 67 is withdrawn from engagement with the rack 66, that then the record may be repeated if the record changer is provided with retention means to avoid the fall down of the next record on the spindle.

Figure 8:
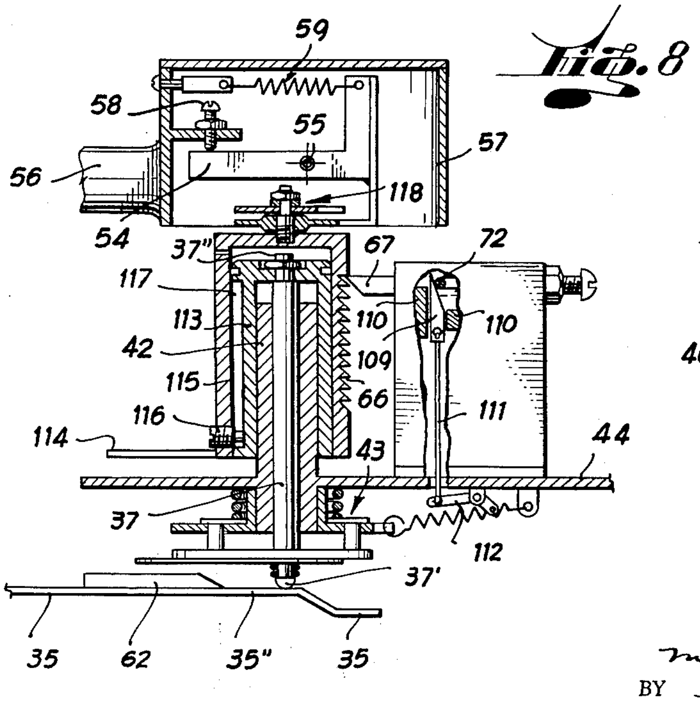
FIG. 8 is a side elevation similar to FIG. 3 of a part of a record changer which operates on the same principle as the one of FIG. 3 and wherein a modified embodiment as to the height retention means is shown.
Figure 5:
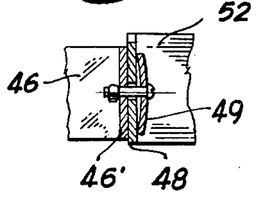
FIG. 5 is a cross section along line V—V of FIG. 4.

In FIG. 8 a similar arrangement is shown for withdrawing the pawl 67 from engagement by acting on stub pin 72 by means of a wedge-like retaining pin 109 suitably guided between a pair of block guides 110 and connected to a rod 111 which projects through the base plate 44 which supports a fulcrumed lever 112 one end of which is connected to the rod 111 while the other end is to be connected to the automatic retaining system of the spindle so that this arrangement instead of being hand operated is coupled to the automatic retaining system for repeating the record and which does not form part of the present invention.

As to the remaining portions of the embodiment shown in FIG. 8 it will be appreciated that this is somewhat more elegant than the previous arrangement inasmuch as it forms a more compact unit. In this embodiment the same elements as those used in the embodiment described in connection with FIGS. 3 to 6, have the same reference numerals and will therefore not be redescribed. The upper end 37'' of the lift pin 37 is connected to a sleeve 113 which is slidably mounted on the bushing 42 and which comprises a projecting foot 114 which is the equivalent to foot 52 in the previous embodiment. A cup-shaped member 115, slidably mounted on said sleeve 113, is provided with a ratchet rack 66 adapted to enter in operative relationship with the pawl 67 as in the previous embodiment. The cup-shaped member 115 is provided with a guide screw 116 which penetrates a vertical slot 117 of the sleeve 113 for guiding purposes. The pick-up arm 56 and more particularly the housing 57 is suitably swingably mounted by means of pin arrangement 118 on the cup-shaped member 115 which is the equivalent to the torsion spring 60 and associated parts of the previous embodiment. It will be understood that each time the spherical slide head portion 37' is raised onto the supplemental platform 62 that the up end 37'' will push the cup-shaped member 115 one tooth further up.

It is believed that it is not necessary to redescribe the complete cycle of operation as to the stepwise elevation of the arrangement in view of the previous description in connection with FIGS. 3 to 6.

It is well known to those skilled in the art that there are other record changers which base their operation not on a to and fro movement of a slide which is commanded by a gear assembly having an eccentric driving pin, but by a raising lever which engages an eccentric groove in the underside of a main cam such as for instance in the Webcor record changer models 151 and 152 manufactured by Webcor, 5610 Bloomingdale Ave., Chicago 39, Ill., U.S.A., which is schematically shown as to those details which are interesting for the present invention in FIGS. 9 to 12.

The last mentioned record changer is likewise well known by those skilled in the art and it is therefore not considered necessary to enter into many details thereof as far as the orthodox arrangement is concerned.

Figure 10:
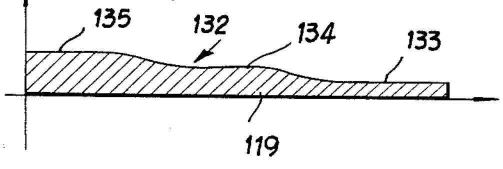
FIG. 10 is a schematically developed planar lay out of the groove of the rotary cam shown in FIG. 9.

The main gear 119 (see FIG. 9) of this record changer is mounted on a stub shaft 120 which is rigidly mounted on the base plate (not shown). The raising lever 121 has a stud 122 at one end which engages an eccentric groove in the underside of the main gear 119, which thus will likewise be called main cam 119. This eccentric groove is not visible in FIG. 9 but a development thereof is shown in FIG. 10 to which reference will be made later on. The raising lever 121 is pivotally supported in its middle portion by an U-shaped bracket 123 which may rotate about vertical shaft 124 mounted in a block 125 which in turn may rotate about an horizontal shaft 126, whereby the raising lever 121 may follow the eccentric groove of the main cam 119. The rear end 121' of raising lever 121 when pivoting upwardly is adapted to contact the lift plate 127 having a friction pad 128 adapted to lift shut-off plate 129 which is integral with a lift pin 130 which may be considered as the equivalent of lift pin 37 of the embodiment described in connection with FIGS. 3 to 8. The lift pin 130 is connected to the tone arm (not shown) for instance through an arrangement similar to that described in connection with the previous embodiment of FIGS. 3 to 8. The trip finger switch and clutch arrangement has again been designated with reference numeral 43 and no explanation will be given in connection therewith inasmuch as it does not form part of the present invention.

While the orthodox model comprises an eccentric groove in the underside of the main cam 119 which besides of its varying radius has two different levels, one corresponding to the position where the tone arm rests on the tone arm rest as well as when the needle is in the groove of the record and the other when the tone arm is to be raised above the record, according to the present invention, as may be appreciated in FIG. 10 the eccentric groove 132 comprises the lowermost position 133, which corresponds to the tone arm rest position and tone arm reproducing position, an intermediate position 134 which corresponds to the position where the tone arm is raised either from the tone arm rest or from the groove of the record which is being reproduced and in addition an uppermost position 135, which is the equivalent of the supplemental platform 62 of the embodiment shown in FIG. 3, which enable to raise the tone arm in cooperation with the attached rack 66 and associated parts (see FIGS. 4 and 8) in an amount of substantially the width of one record.

It will thus be appreciated that for this part all that is necessary is to change main cam or main gear 119 in the existing model of record changer.

As to the restoring means, in this arrangement, which enables the pulling down of foot 52 (see FIGS. 3 and 6) in the embodiment of FIG. 9 reference will now be made to FIGS. 11 and 12 wherein the main gear 119 and the stub shaft 120 are again shown. On the underside of the main gear 119 an L-shaped engagement lever 136 (FIGS. 11 and 12) is pivoted by means of its horizontal longer branch 136′ on pivot 137 supported by said main gear 119, which thus enables the L-shaped engagement lever 136 to oscillate about said pivot 137. The vertical shooter branch 136″ enters a housing 138 in which a spring 139 urges said L-shaped engagement lever 136 into a position which is substantially radial with regard to the axis of stub shaft 120.

On a stationary support 140 (only shown in FIG. 11) a bracket 141 is mounted having a pivot 142 swingably supporting a commanding lever 143 which is to be engaged by the overarm pin 144 when the last record is being played whereby said commanding lever 143 will rotate in clockwise direction.

A cardan column 145 more particularly consisting of a first bearing 146 mounted on said stationary support 140 and rotatably supporting the vertical stud pin 147 which in turn is integral with an U-shaped bracket 148 which swingably supports by means of horizontal shaft 149 a cylinder 150. A cable 151 which is the equivalent to cable 103 (see FIG. 6) passes through said cylinder 150 and ends in an engagement ear 152 located when in inoperative position adjacent to the front face 150′ of cylinder 150. The free front end 143′ of the commanding lever 143 is located below the cylinder 150 (see FIG. 11).

Upon the overarm pin 144 passing on the commanding lever 143 the free front end 143′ raises the front base portion 150′ of the cylinder 150 so that when the main gear 119 rotates in the direction of arrow 153 the engagement ear 152 will be within the path of the horizontal longer branch 136′ of the L-shaped engagement lever 136 so that the engagement takes place as shown in FIG. 12 and the cable 151 will be pulled forward at the same time as the L-shaped engagement lever 136 continues in its rotary movement whereby the cylinder 150 will likewise start to rotate about vertical stub pin 147 up to a maximum position which corresponds to that where the return lever 53 (see FIG. 6) has reached the lowermost position at which instant due to the circular path the L-shaped engagement lever 136 slides out of engagement with the engagement ear 152 whereby the compression spring 96 (FIG. 6) will restore the vertical return shaft 93 to the position shown in FIG. 6.

A tension spring 154 (FIG. 12) linked to the bracket 141 and a projecting nose 155 mounted on the bracket 148 will restore the cylinder 150 to the position shown in FIG. 12.

It will thus be appreciated that the modifications which have to be made in this model of record changer are actually adding accessories without having to change the mechanism itself with the exception of the main cam or gear 119.

Another type of record changer which is based again on a different principle is "Garrard" manufactured by Garrard Engineering and Manufacturing Co., Ltd., Newcastle Street, Swindon, Wilts., England, and more particularly the model known as RC 120, RC 120/4, RD 121, RC 121/4 and of which again on those parts which are interesting for the present invention are shown in FIGS. 13 and 14. More particularly, this embodiment comprises a gear cam 156 mounted on a cam stud 157 and having an underside peripheral cam 158 which instead of having two zones as in the orthodox arrangement comprises three zones, more particularly the inoperative zone 159 (FIG. 14), the tone arm lifting zone 160 and the tone arm height adjusting zone 161 which are the equivalents to the lower end platform 35′, the upper platform 35″ and the supplemental platform 62 of the embodiment of FIG. 3.

A follow up lever 162 having a follower up pin 172 and pivoted on pivot 163 follows said peripheral cam 158 and is linked to an intermediate lever 164 through pivot 165 and further pivoted through pivot 166 to a lifting disk 167 having a lifting spindle 168 (FIG. 13). The lifting disk 167 is integral with an angled lever 169 pivotally connected by pivot 170 to a bracket 171.

The lifting spindle 168 is in abutting contact with the base 173 of the schematically shown control means 174 which further comprises the pick-up spindle 175 which is the equivalent to lift pin 37 of the embodiment of FIG. 3 and to which the same or similar elements as are described are connected.

In this embodiment when the follower up pin 172 contacts the inoperative zone 159 the pick-up arm is either on the pickup rest (not shown) or the needle is in a groove of a record. When the follower up pin 172 contacts the tone arm lifting zone 160 the tone arm is lifted from the pick-up rest or from the groove and finally when follower up pin 172 engages the tone arm height adjusting zone 161, the ratchet rack 66 (FIGS. 4 and 8) is carrying out its operative raising step.

As to the pulling down of the tone arm in order to start a new stack of records the same arrangement is used as that described in connection with FIGS. 11 and 12.

To those who are not too familiar with the art of existing automatic record changers and particularly with regard to the three models described, attention is called to the publication of Automatic Record Changer Service Manual volume 10, 1st. edition, January 1959, compiled and published by Howard W. Sams & Co. Inc., Indianapolis 5, Indiana, U.S.A.

Figure 15:
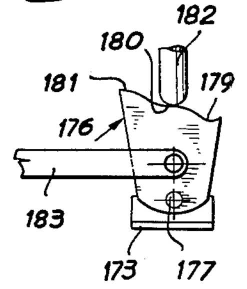
FIG. 15 is a side elevation of still another possibility of operating either the spindle of the turntable or the shaft of the tone arm based on a swingable cam.

In FIG. 15 an arrangement is shown consisting of an oscillating cam 176 pivoted on pivot 177 mounted on bracket 178 and having an inoperative zone 179, a tone arm lifting zone 180 and a tone arm height adjusting zone 181 which are the equivalent to the zones 159, 160 and 161 described in connection with FIG. 14. A lift pin 182 engages said oscillating cam 176 and a control lever 183 moves to and fro to raise or lower the lift pin 182.

From the foregoing it will be appreciated that the present invention may be applied to any type of automatic record changer whether the commanding part moves rectilinearly to and fro such as slide 35 (FIG. 3) or moves to and fro in an oscillating movement, such as oscillating cam 176 (FIG. 15) or carries out a rotary movement such as described in connection with the embodiment of FIGS. 9 and 13.

I claim:

1. In an automatic record changer having a base plate, a central spindle, a turntable mounted on said central spindle and being adapted to successively receive one by one record of a stack of records arranged on said spindle and spaced apart from said turntable, each record having a groove, a shaft, a tone arm including at least one needle and swingably mounted on said shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including means for stepwise changing the height of at least one of said shaft and spindle with regard to said base plate and which last mentioned means are synchronized with said record changer means, and restoring means for gradually and directly restoring, with controlled movement, said one of said shaft and spindle to its starting position with regard to said base plate, said restoring means being operable as soon as the last record of said stack of records has been played.

2. In an automatic record changer having a base plate, a central spindle, a turntable mounted on said central spindle and being adapted to successively receive one by one record of a stack of records arranged on said spindle and spaced apart from said turntable, each record having a groove, a shaft, a tone arm including at least one needle and swingably mounted on said shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including means for stepwise changing the height of said shaft with regard to said base plate and which last mentioned means are synchronized with said record changer means, and restoring means for gradually and directly restoring, with controlled movement, said shaft to its starting position with regard to said base plate, said restoring means being operable as soon as the last record of said stack of records has been played.

3. In an automatic record changer having a base plate, a central spindle, a turntable mounted on said central spindle and being adapted to successively receive one by one record of a stack of records arranged on said spindle and spaced apart from said turntable, each record having a groove, a shaft, a tone arm including at least one needle and swingably mounted on said shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including means for stepwise changing the height of said spindle with regard to said base plate and which last mentioned means are synchronized with said record changer means, and restoring means for gradually and directly restoring, with controlled movement, said spindle to its starting position with regard to said base plate, said restoring means being operable as soon as the last record of said stack of records has been played.

4. In an automatic record changer having a base plate, a central telescopical spindle, a turntable mounted on said central telescopical spindle and being adapted to successively receive one by one record of a stack of records arranged on said spindle and spaced apart from said turntable, each record having a groove, a telescopical shaft, a tone arm including at least one needle and swingably mounted on said telescopical shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including elevator means synchronized with said record changer means for changing the height of at least one of said telescopical shaft and spindle with regard to said base plate in an amount equivalent to the width of one record, pawl and ratchet rack retention means in structural relationship with said one of said telescopical shaft and spindle for retaining the additional height supplied by said elevator means and returner means for returning said one of said telescopical shaft and spindle to its start position, and restoring means for gradually and directly restoring, with controlled movement, said one of said shaft and spindle to its starting position with regard to said base plate, said restoring means being operable as soon as the last record of said stack of records has been played.

5. In an automatic record changer having a base plate, a central spindle, a turntable mounted on said central spindle and being adapted to successively receive one by one record of a stack of records arranged on said spindle and spaced apart from said turntable, each record having a groove, a telescopical shaft arrangement, a tone arm including at least one needle and swingably mounted on said telescopical shaft arrangement, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including elevator means synchronized with said record changer means for stepwise changing the height of said telescopical shaft arrangement with regard to said base plate in successive amounts substantially equivalent to the width of one record, a pawl mounted on said base plate, a ratchet means integral with said tone arm and adapted to mesh with said pawl and retaining means relating said telescopical shaft arrangement and said ratchet means of said tone arm to maintain said telescopical shaft arrangement in different lengthened positions, and returner means connected to said ratchet means for returning said telescopical shaft arrangement to collapsed position.

6. In an automatic record changer as claimed in claim 5, wherein said ratchet means is a ratchet rack.

7. In an automatic record changer having a base plate, a central spindle including a tip portion, a turntable mounted on said central spindle and being adapted to successively receive one by one record of a stack of records arranged on said spindle and spaced apart from said turntable, each record having a groove, a shaft, a tone arm including at least one needle and swingably mounted on said shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including a cam disc, a driving shaft for stepwise driving said cam disc, said driving shaft being synchronized with said record changer means, said cam disc being excentrically mounted on said driving shaft, said cam disc having a peripherical portion, a plurality of spaced apart notches in said peripherical portion, said tip portion resting on said peripherical portion, said notches being so spaced apart that each pair of adjacent notches defines a difference of height equivalent to the width of one record with regard to said spindle and returner means for returning said cam disc to its start position.

8. In an automatic record changer having a base plate, a central spindle, a turntable mounted on said central spindle and being adapted to successively receive one by one record of a stack of records arranged on said spindle and spaced apart from said turntable, each record having a groove, a shaft including a tip portion, a tone arm including at least one needle and swingably mounted on said shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including a cam disc, driving means for stepwise driving said cam disc, said driving means being synchronized with said record changer means, said cam disc having a peripherical portion, plurality of spaced apart notches in said peripherical portion, said tip portion resting on said peripherical portion, said notches being so spaced apart that each pair of adjacent notches defines a difference in height substantially equivalent to the width of one record with regard to said shaft, and returner means for returning said cam disc to its start position.

9. In an automatic record changer as claimed in claim 8, wherein said driving means consist of a ratchet wheel eccentrically mounted on said cam disc, a double arm having an upper branch and a lower branch, a pulling pawl pivoted on said upper branch and a pushing pawl pivoted on said lower branch, said pulling pawl and said pushing pawl being adapted to mesh said ratchet wheel on substantially diametrical opposite portions.

10. In an automatic record changer having a base plate, a central spindle, a turntable mounted on said central spindle and being adapted to successively receive one by one record of a stack of records arranged on said spindle and spaced apart from said turntable, each record having a groove, a lift pin including a spherical slide head portion and an upper end, a tone arm arrangement including at least one needle and swingably related to said upper end of said lift pin, record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said record changer means including a to and fro moving slide having a lower end platform, an upper platform and a supplemental platform mounted on said upper platform, said supplemental platform forming part of said height compensating mechanism, said spherical slide head portion being adapted to rest on said slide and being adapted to pass along said lower platform, upper platform and supplemental platform to thereby successively raise and lower said left pin, said tone arm arrangement including a longitudinal slotted elevator plate having a ratchet rack, a bell crank lever connected to said upper end of said lift pin and having a vertical guide arm, said longitudinally slotted elevator plate being slidably connected to said vertical guide arm, a leaf spring likewise supported by said vertical guide arm and frictionally urging said elevator plate against said vertical guide arm, a block mounted on said base plate adjacent to said elevator plate, a resiliently urged slidable pawl in said block and projecting out therefrom and adapted to mesh with said ratchet rack.

11. In an automatic record changer as claimed in claim 10, wherein a stub pin is integral with said pawl and projects into said block, a wedge-like retaining pin controllably arranged in said block and adapted to enter in blocking contact with said stub pin for retaining said pawl out of mesh with said ratchet rack.

12. In an automatic record changer as claimed in claim 10, and further comprising a record support shaft arrangement, said elevator plate comprises a foot projecting away from said elevator plate, a return lever arranged above said foot and adapted to enter in contact therewith for pulling down said foot, a bushing supported by said base plate, a return shaft slidably housed in said bushing and having a lower end portion projecting out of said bushing a compression spring coiled around said return shaft and housed in said bushing and urging said return shaft upwardly a rail integral with said bushing, a hook slidably mounted on said rail, a cable connecting said hook with said lower end portion of said return shaft, a returner slide including an upstanding arm ending in a bevelled end tooth adapted to mesh with said hook, said returner slide being pivoted to said to and fro moving slide, and means for raising and lowering said returner slide into and out of the path of said hook, said last mentioned means being connected to said record support shaft arrangement.

13. In an automatic record changer having a base plate, a central spindle, a turntable mounted on said central spindle and being adapted to successively receive one by one record of a stack of records arranged on said spindle and spaced apart from said turntable, each record having a groove, a lift pin including a spherical slide head portion and an upper end, a tone arm arrangement including at least one needle and swingably related to said upper end of said lift pin, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said record changer means including a to and fro moving slide having a lower end platform, an upper platform and a supplemental platform mounted on said upper platform, said supplemental platform forming part of said height compensating mechanism, said spherical slide head portion being adapted to rest on said slide and being adapted to pass along said lower platform, upper platform and supplemental platform to thereby successively raise and lower said lift pin, said tone arm arrangement including a vertically slotted sleeve connected to said upper end of said lift pin, a cup shaped member slidably mounted on said sleeve and including a guide screw slidably guided by said vertically slotted sleeve, said cup shaped member including a ratchet rack, said tone arm arrangement being connected to said cup shaped member, a block mounted on said base plate adjacent to said cup shaped member, a resiliently urged slidable pawl in said block and projecting out therefrom and adapted to mesh with said ratchet rack.

14. In an automatic record changer as claimed in claim 13, wherein a stub pin is integral with said pawl and projects into said block, a wedge-like retaining pin controllably arranged in said block and adapted to enter in blocking contact with said stub pin for retaining said pawl out of mesh with said ratchet rack.

15. In an automatic record changer as claimed in claim 13, and further comprising a record support shaft arrangement, said cup shaped member comprises a foot projecting away from said cup shaped member, a return lever arranged above said foot and adapted to enter in contact therewith for pulling down said foot, a bushing supported by said base plate, a return shaft slidably housed in said bushing and having a lower end portion projecting out of said bushing, a compression spring coiled around said return shaft and housed in said bushing and urging said return shaft upwardly, a rail integral with said bushing, a hook slidably mounted on said rail, a cable connecting said hook with said lower end portion of said return shaft, a returner slide including an upstanding arm ending in a bevelled end tooth adapted to mesh with said hook, said returner slide being pivoted to said to and fro moving slide, and means for raising and lowering said returner slide into and out of the path of said hook, said last mentioned means being connected to said record support shaft arrangement.

16. In an automatic record changer having a base plate, a central spindle, a turntable mounted on said central spindle and being adapted to successively receive one by one record of a stack of records adapted to be arranged on said spindle and spaced apart from said turntable, each record having a groove, a lift pin including a lift plate, a shutoff plate and a friction pad for clutching said lift plate to said shutoff plate, a tone arm including at least one needle and swingably related to said shutoff plate, record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said record changer means including a rotatable main gear cam having an eccentric endless groove including a lowermost portion an intermediate portion and an uppermost portion, a raising lever having a front end and a rear end, a stud mounted on said front end and meshing with said groove, said rear end being connected to said lift plate, said raising lever being pivotally supported in both planes intermediate its front end and rear end, said tone arm including a lengthenable connection connecting said tone arm to said shutoff plate, a pawl and ratchet rack retention means for retaining the additional height supplied by said uppermost portion which is substantially equivalent to the width of one record, said ratchet rack retention means being mounted on said lengthenable connection.

17. In an automatic record changer having a base plate, a central spindle, a turntable mounted on said central spindle and being adapted to successively receive one by one record of a stack of records adapted to be arranged on said spindle and spaced apart from said turntable, each record having a groove, a pick-up spindle mounted on vertical movable control means supported by said base plate, a base integral with said control means, a bracket supported by said base plate, an angled lever including a lifting disc having a lifting spindle, said angled lever being pivotally supported by said bracket, said lifting spindle being arranged below said base, a swingable follower up lever, an intermediate lever pivoted to said follower up lever and to said angled lever, a gear cam having an underside peripheral cam, a follower up pin mounted on said follower up lever and in sliding contact with said underside peripherical cam, having an inoperative zone, a tone arm lifting zone and a tone arm height adjusting zone, a tone arm including at least one needle, record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism for maintaining said needle always at the same angle with regard to the groove of each record on the top of the stack on said turntable independently of the height of the stack of records located on said turntable, said height compensating mechanism including a stretchable connection linking said tone arm with said pick-up spindle, a pawl and ratchet rack retention means for retaining the additional height supplied by said tone arm height adjusting zone which is substantially equivalent to the width of one record, said ratchet rack retention means being mounted on said stretchable connection.

18. In an automatic record changer having a base plate, a central spindle, a turntable mounted on said central spindle and being adapted to successively receive one by one record of a stack of records arranged on said spindle and spaced apart from said turntable, each record having a groove, a lift pin, a tone arm including at least one needle and swingably related to said lift pin, record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height compensating mechanism including an oscillating cam having an inoperative zone, a tone arm lifting zone and a tone arm height adjusting zone, said height compensating mechanism being adapted to maintain said needle always at the same angle with regard to the groove of each record on the top of the stack on said turntable independently of the height of the stack of records located on said turntable, said height compensating mechanism including a stretchable connection linking said tone arm with said lift pin, a pawl and ratchet rack retention means for retaining the additional height supplied by said tone arm height adjusting zone which is substantially equivalent to the width of one record, said ratchet rack retention means being mounted on said stretchable connection.

19. An automatic record changer as claimed in claim 1, wherein said restoring means comprises pulling means for restoring with a smooth and continuous controlled movement said one of said shaft and spindle to its starting position.

20. An automatic record changer as claimed in claim 2, wherein said restoring means comprises pulling means for restoring with a smooth and continuous controllled movement said shaft to its starting position.

21. An automatic record changer as claimed in claim 3, wherein said restoring means comprises pulling means for restoring with a smooth and continuous controlled movement said spindle to its starting position.

22. An automatic record changer as claimed in claim 4, wherein said restoring means comprises pulling means for restoring with a smooth and continuous controlled movement said one of said shaft and spindle to its starting position.

23. An automatic record changer as claimed in claim 5, wherein said returner means includes pulling restoring means for restoring with a smooth and continuous controlled movement said shaft to its starting position with regard to said base plate, said restoring means being operable as soon as the last record of said stack of records has been played.

24. In an automatic record changer having a base plate, a central spindle, a turntable mounted on said central spindle and being adapted to successively receive one by one record of a stack of records arranged on said spindle and spaced apart from said turntable, each record having a groove, a shaft, a tone arm including at least one needle and swingably mounted on said shaft, a record changer means for supporting a supply stack of records on said spindle spaced from said turntable and for successively separating the bottom record from said supply stack and positioning said bottom record on said turntable to form a stack of records on said turntable, said record changer means maintaining said supply stack spaced apart from said stack on said turntable during said separation and positioning, a height-compensating mechanism for maintaining said needle always at the same angle with regard to the groove of each record on the top of said stack on said turntable independently of the height of the stack of records located on said turntable, said height-compensating mechanism including means for stepwise changing the height of at least one of said shaft and spindle with regard to said base plate as the stack of records on said turntable increases in size without restoring said height to its starting position until the last record of said supply stack has been played and which last-mentioned means are synchronized with said record changer means, and restoring means for gradually and directly restoring, with controlled movement, said one of said shaft and spindle to its starting position with regard to said base plate, said restoring means being operable as soon as the last record of said stack of records has been played.

References Cited in the file of this patent

UNITED STATES PATENTS

| | | |
|---|---|---|
| 2,661,217 | Bidinger | Dec. 1, 1953 |
| 2,665,134 | Gianelli | Jan. 5, 1954 |
| 2,860,880 | Mueller | Nov. 18, 1958 |
| 2,960,340 | Seidel et al. | Nov. 15, 1960 |